United States Patent [19]

Coburn et al.

[11] Patent Number: 4,638,339

[45] Date of Patent: Jan. 20, 1987

[54] ELECTROGRAPHIC CHARGE DEPOSITION APPARATUS

[75] Inventors: Richard J. Coburn, West Hartford; Walter C. Dean, III, Simsbury, both of Conn.; Thomas D. Kegelman, Palm Harbor, Fla.; Norman L. Milliard, Stafford Springs, Conn.

[73] Assignee: KCR Technology, Inc., Hartford, Conn.

[21] Appl. No.: 794,640

[22] Filed: Nov. 4, 1985

[51] Int. Cl.[4] .............................................. G01D 15/06

[52] U.S. Cl. ................................ 346/153.1; 355/3 BE

[58] Field of Search .................. 346/153.1; 355/3 BE; 400/119; 101/DIG. 13; 358/300

[56] References Cited

U.S. PATENT DOCUMENTS

| | | | |
|---|---|---|---|
| 4,218,641 | 8/1980 | Fujii | 346/153.1 |
| 4,227,452 | 10/1980 | Tamai | 346/153.1 |
| 4,396,927 | 8/1983 | Amaya et al. . | |

*Primary Examiner*—Arthur G. Evans

*Attorney, Agent, or Firm*—Hayes & Reinsmith

[57] ABSTRACT

In electrographic printing apparatus, a charge transfer endless-loop dielectric belt including a conductive member to effect a ground plant is supported to tension with an unsupported portion thereof disposed opposite the electrodes of the print head. The unsupported portion results from belt engagement with the printhead in regions adjacent to the electrodes to provide the desired electrode/dielectric belt spacing.

10 Claims, 9 Drawing Figures

ELECTROGRAPHIC CHARGE DEPOSITION APPARATUS

FIELD OF THE INVENTION

This invention generally relates to electrogaphic printing apparatus and is more particularly directed to such printing apparatus for effecting charge deposition including apparatus for maintaining the desired spacing to effect proper controlled charge deposition.

BACKGROUND OF THE INVENTION

The general apparatus within which the present invention is utilized is believed to be well known in the prior art to provide a dielectric belt arranged and supported in an endless tensioned loop, the belt being provided with an electrically conductive coating underneath the dielectric. The belt is continuously cleaned and electrically conditioned for re-use as it approaches a print head which modifies the charge thereon to form a latent image which is subsequently developed with a toner; the toned image is transferred to paper and fixed such as by application of heat at a fusing station.

In the prior art, Paschen ionization has been employed in electrographic printers and plotters utilizing treated paper wherein the paper is rendered conductive through, for example, the introduction of salts; the surface receiving the electrostatic charge is coated with a thin (few micron) layer of dielectric material. Additionally off-set systems have been reduced to practice employing conductive drums and belt structures which are dielelctrically coated.

The prior art paper systems have had limited application due to the cost of treated paper. The drum systems require precision alignment mechanisms to establish and maintain the necessary Paschen spacing over the full print width. Belt structures have been devised which employ textured surfaces to establish Paschen spacing but these surfaces are subject to wear and thus short life. Other spacing techniques have been deviced which employ abrupt discontinuities near the imaging region; these techniques suffer from contamination and abrasive wear.

The transfer of charge across an air gap has been described by Friedrich Paschen. In his experiments, Paschen discovered that the voltage necessary to initiate ionization was defined by a function that related the product of gas pressure and spacing of electrodes to voltage and determine that, at constant pressure, the voltage reduces to a function of distance only. Experiments have been conducted to establish the de-ionization potential and it is reported that ionization appears to extinquish at a level equal to or perhaps 20 volts below the Paschen function.

Clearly it is established in the prior art that air gap spacing is an exceedingly important consideration in electrographic printing.

OBJECTS OF THE INVENTION

It is a principal object of this invention to provide improved appratus to establish the desired spacing between a charge source or electrode and a charge carrier or dielectric with ground plane in apparatus which provides for charge deposition in connection with electrographic printing apparatus.

It is a further object of this invention to provide simplified support structure for the flexible dielectric belt of charge deposition electrographic printers whereby the desired spacing between the charge source and the dielectric is maintained.

It is a still further object of the invention to provide an improved print head to effect charge deposition on a dielectric member.

It is an additional object of the invention to provide improved electrographic printing apparatus of the type described having improved print head cleaning.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the various ways in which the principles of the invention are employed.

SUMMARY OF THE INVENTION

The present invention, in its simpliest form, provides a charge transfer endless-loop dielectric belt having an unsupported portion thereof disposed opposite the electrodes of conductive members of the print head. The unsupported portion results from careful selection of belt parameters, belt engagement with the print head in regions adjacent to the electrodes and provides critical spacing between the conductive members and the dielectric belt to effect controlled charge deposition from those conductive members through the air gap to the charge carrying dielectric belt. Apparatus for cleaning the conductive members is also provided.

DETAILED DESCRIPTION OF THE INVENTION

Figure 1:
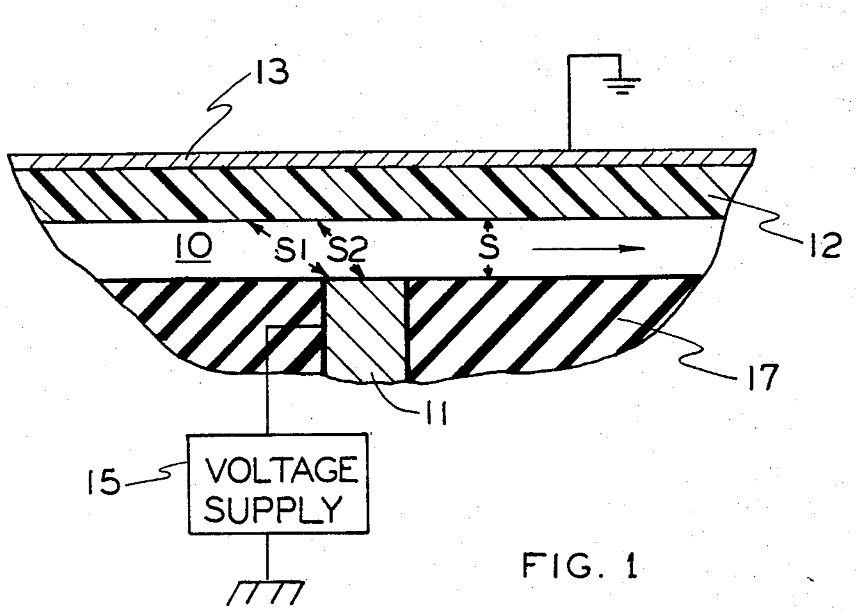
FIG. 1 schematically illustrates a prior art electrostatic charge transfer drive.

As seen in the prior art of FIG. 1, electric charge transport across air gap 10 between conductive pin 11 (mounted in insulating support 17) and moving dielectric 12 having a conductive ground plane layer 13 requires precise control of the thickness of dielectric 12, dielectric constant of the material, conductive element to dielectric surface potential difference as determined by voltage source 15 and spacing "S" between conductive pin or element and the dielectric surface. It is also to be recognized that as a point on the dielectric surface enters the region of the conductive element because of movement of the dielectric in the direction of the arrow, a large range of distances ($S_1$ and $S_2$) from the electrode 11 are encountered. The minimum distance is achieved along a line normal to the belt plane of tangency and passing through the conductive element surface. Analysis indicates that the spacing must reach a minimum of 0.4 mils (for a dielectric thickness of 0.25 mils and a dielectric constant of 3.0) in order to achieve maximum controlled charging of the dielectric. Larger distances will fail to achieve this charging, whereas conduction resulting in high charge transfer will occur under direct contact (pressure). At distances of 0 to 0.15 mils the conduction is erratic due to high field emission effects coupled with insufficient gap to support Townsend multiplication. Achieving a spacing of less than 0.4 mils, but greater than 0.15 mils, is a purpose of this invention.

Figure 2:
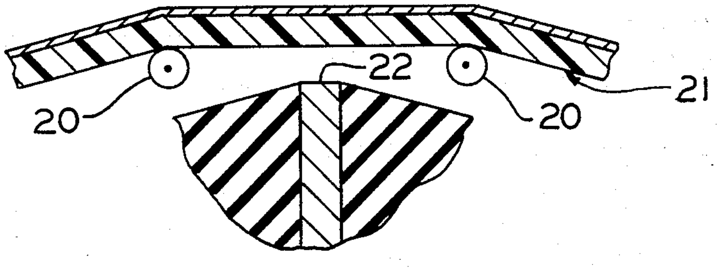
FIG. 2 schematically illustrates a prior art dielectric belt support.

Prior art devices have employed a textured dielectric surface to provide spacing by virtue of surface anomolies of the texture that are of the order of the desired spacing. In addition, it is known (see FIG. 2) to use rollers 20 act as a surface reference to position dielectric surface 21 relative to electrodes 22.

Textured surface spacing has been used successfully for direct printing on treated paper, however, in offset printing where the surface is reused, the surface texture is erroded resulting in a short surface life and, therefore, frequent replacement. Roller spacing has been employed experimentally, however, the precision control necessary to achieve the small dimensions dictated by the charge transfer physics is such that practical configurations have not been achieved.

Figure 3:
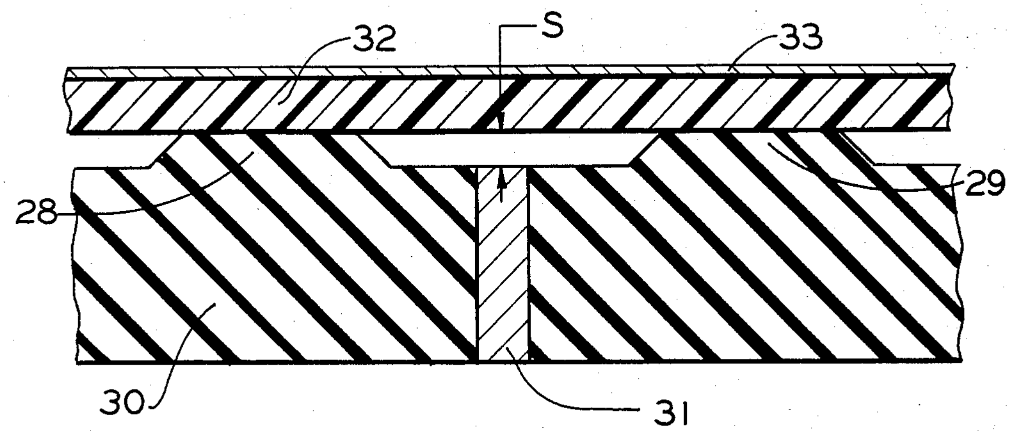
FIG. 3 also illustrates prior art fundamental considerations in belt support.

FIG. 3 also illustrates a basic prior art structure wherein the supports 28 and 29 of insulating support 30 are raised the desired spacing distance S above the conductive element 31. Under dynamic conditions of high speed printing wherein dielectric 32 and conductive layer 33 are moving past the conductive element 31 at high speeds, it has been found that the spacing S will vary in an unacceptable manner due to the lack of a suitable holding force between belt 32 and supports of 28 and 29 as well as other considerations.

The present invention provides a spacing technique wherein a smooth, flexible dielectric surface is unsupported in the region of the electrodes or conductive element forming a part of an arcuate print head, the spacing being achieved by the formation of support surfaces that are interrupted in the region of the conductor together with careful construction of the flexible dielectric belt that provides the charge receiving surface.

Figure 4:
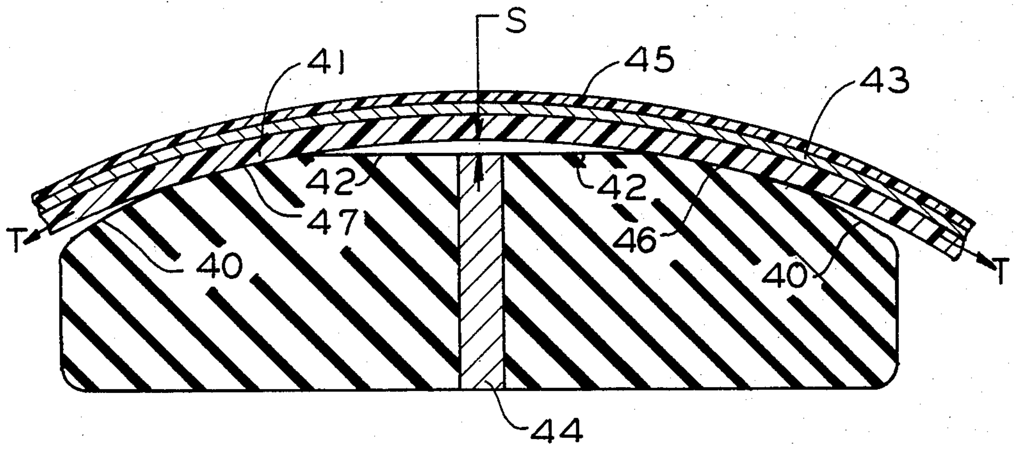
FIG. 4 is a schematic illustration of a cross section of preferred embodiment of the print head of this invention.

FIG. 4 illustrates a preferred form of the invention wherein a generally cylindrical support surface 40 is provided for the flexible dielectric belt 41, support surface 40 having a essentially flattened region 42 provided in the region of and adjacent to the conductive element 44. Belt 41 is provided with a conductive coating member 43 and a reinforcing member 45 (of suitable material such as Mylar Plastic) and is suitably driven and very nearly conforms to the generally cylindrical support surfaces 46 and 47 (having common centers) except for the desired space S in the region of element 44. The spacing S is geometrically predictable and deviates from simple geometry when the belt 41 is under tension T as a function of that tension, the cylindrical radius and bending modulus of the belt.

It is to be particularly noted that the tensioned belt which consists of elements 41, 42 and 43 is formed of a material that has a sufficiently high bending modulus to ensure formation of the desired gap S and to preclude substantial conformity of belt 40 in print head area 42 so as to permit the belt 40 and the electrode 44 to touch; by the same token, the bending modulus must be low enough to permit the needed belt deflection to generally follow the cylindrical surface 40 under tension forces. It is also believed quite important that belt 40 shall have a smooth surface engaging the support surface 40 and that there are no abrupt surface discontinuities on print head support surface 40 to effect undue belt wear, accumulate foreign matter or to modify the desired spacing or electric characteristics. Clearly it is desirable to use materials for the belt and support surfaces to minimize unwanted static charging of the belt, which materials will also provide good release surface characteristics for avoiding unwanted accumulation of foreign matter which adversely affects the desired charging characteristics.

Figure 5:
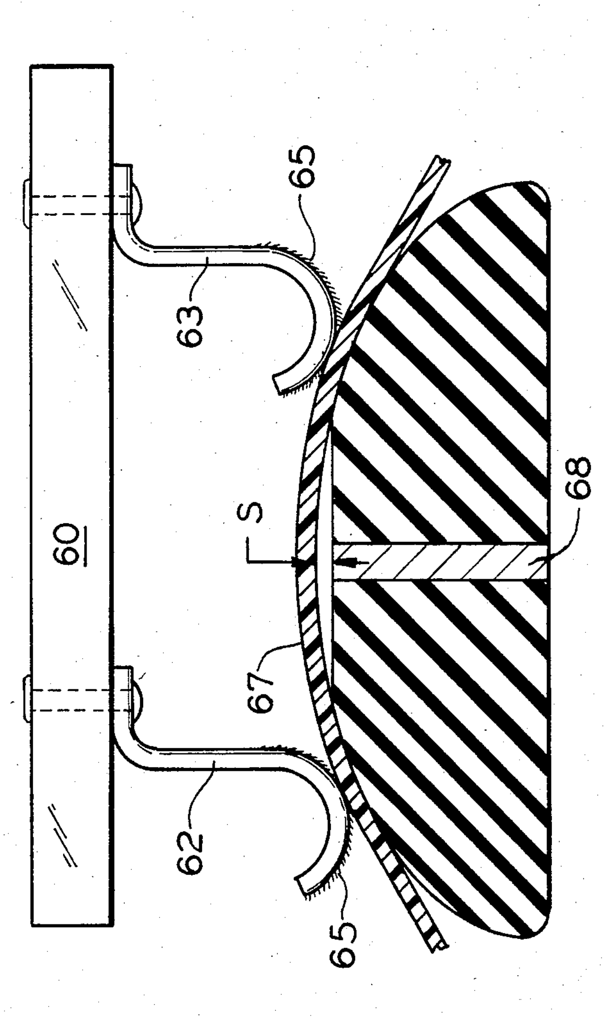
FIG. 5 is a view, similar to FIG. 4, showing use of snubbers.

It has been found that dielectric belts under tension are subject to distortion resulting in "waves" appearing in the belt and such can be of sufficient amplitude to create an intolerable spacing error. It has been found that running a belt over a cylindrical guide member tends to inhibit wave formation. Additionally FIG. 5, which describes apparatus substantially identical to FIG. 4, schematically discloses a frame 60, suitably supported, to which snubbers 62 and 63 are secured. Snubbers 62 and 63 are formed from a resilient material and provided with a low-friction felt nap coating 65 which engages the foil coating of belt 67; such a structure has been found to be an acceptable technique for controlling such waves so as to maintain the desired spacing S between electrode 68 and dielectric belt 67.

Spacing variations due to electrostatic forces resulting from conductive element voltage variations are also effectively eliminated by proper snubber selection.

Figure 6:
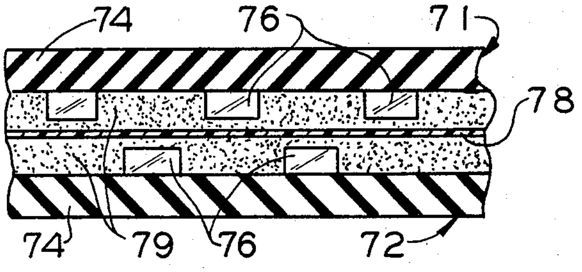
FIG. 6 is a schematic view of the typical electrode construction.
Figure 7:
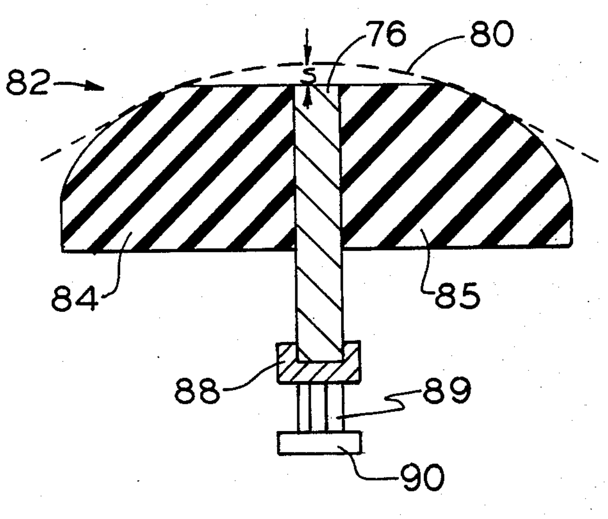
FIG. 7 is a partial cross-section view of the print head.

A likely form of construction of the print head of this invention is shown in FIGS. 6 and 7. In FIG. 6, wherein an end view of the electrode assembly is shown, it is seen that the assembly includes a pair of printed circuit boards 71 and 72 are utilized, each board having an insulating substrate 74 supporting a plurality of individual conductive electrodes 76 as desired. The electrode pattern is such that the electrodes on board 7 are off-set from those on board 72. Upon assembly, an insulating separator 78 being disposed between the boards (and conductors) with an expoxy cement 79 substantially filling any void or space.

FIG. 7 shows the dielectric member or belt 80 in dotted lines to show the cooperation with the print head generally designated 82, which print head is substantially as shown in the preceeding FIG. 4. FIG. 7 is a cross-section view showing the electrode assembly of FIG. 6 sandwiched between and supported by two contoured belt support elements 84 and 85, which elements are configured as previously described to provide the desired belt spacing S from the ends of electrodes 76. Elements 84 and 85 are preferably formed of laminated fiberglass and epoxy to provide suitable strength and electrical insulation and are thereafter lapped and polished to provide the desired support radius and flattened area.

A suitable connector 88 establishes electrical connection between the electrodes through cable 89 to drive circuit 90.

Figure 8:
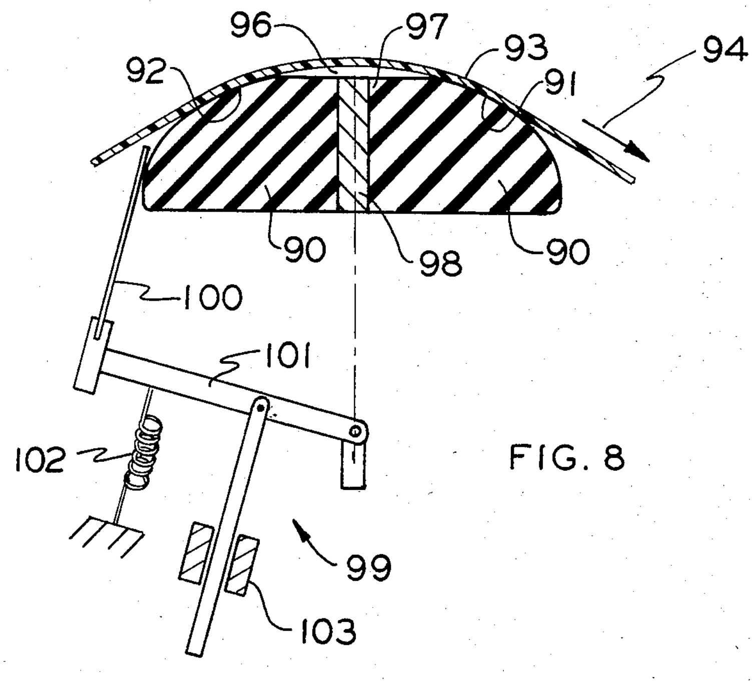
FIG. 8 is a partial cross section view of the apparatus of FIG. 4 with head cleaning apparatus.
Figure 9:
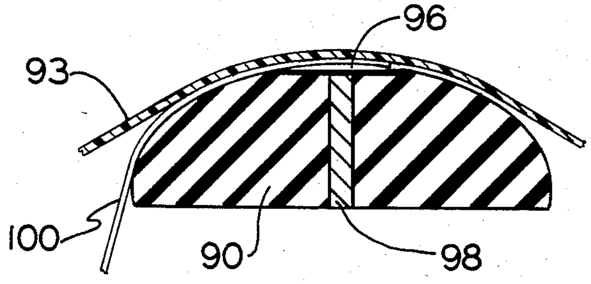
FIG. 9 is a fragmentary view of a portion of the apparatus of FIG. 8.

Not only does use of the present invention permit facile establishment of the desired spacing of the dielectric belt from electrodes, it also enables the facile cleaning of the electrodes to remove foreign matter associated with dielectric charge transfer printers wherein the belt is constantly reused and toner particles tend to accumulate. Turning next to FIG. 8 wherein the invention of FIG. 4 is partially illustrated but without electronics, conductive belt backing, etc., it is seen that cylindrical support 90 provides the desired cylindrical belt support surface 91 and 92 for dielectric belt 93, which belt is under tension and suitably driven in the direction of arrow 94. Tension forces belt thickness, etc. are selected as before, with particular attention being given to the bending modulus so as to establish the desired belt/electrode gap 96. The region 97 in the area of the electrodes 98 is a discontinuity in cylindrical support 90 but that discontinuity can be of any desired configuration so long as belt support surfaces are smooth, the belt is smooth and the desired gap 96 is provided and maintained. With all conditions and parameters achieved the cleaning apparatus generally designated 99 is effectively utilized. A fairly flexible cleaning member 100 is mounted on pivoted arm 101, the arm being biased to a non-use position by spring 102 and movable by solenoid 103 to insert cleaning member 100 beneath moving belt 94 and support surface 92. Movement of the cleaning member 100 into the region of the support area 92 thereafter to area 97 and support surface 91 is facilitated by movement of belt 93 which, in effect, drags the cleaning member along. Typically, cleaning member 100 is a soft, compressible fibrous material such as paper and its movement into the area to be cleaned is facilitated as best seen in FIG. 9, where like numbers are used for the like members and elements of FIG. 8.

Fibrous paper cleaning element has a typical thickness of 2 to 3 mils. Gap 96 (FIG. 8) is preferably in the range of 0.25 mils. Thus, the soft fibrous material fills the gap area 96, (and may be compressed) to the point of actually deflecting belt 93 because of its thickness as it moves across the support surfaces.

Upon energization of solenoid 103, the cleaning paper is withdrawn to further clean the support surfaces, flattened area and pins; however, without the proper modulus of bending for belt 93, such cleaning action would not be possible. Such cleaning clearly must be conducted in a non-print portion of the cycle of operation.

As will be apparent to persons skilled in the art, various modifications, adaptations and variations of the foregoing specific disclosure can be made without departing from the teachings of this invention.

We claim:

1. Apparatus for establishing the spacing between a conductive member and a moving dielectric member in an electrogaphic printer comprising:

- a flexible dielectric member having an electrically conductive ground plane backing element and reinforcing layer;
- support means for the dielectric member including two closely spaced support areas defined by particylindrical surfaces engaging the dielectric member and defining an unsupported region of the dielectric member therebetween,
- a conductive member and means supporting said conductive members in the unsupported region of the dielectric member and spaced therefrom;
- the bending modulus of said dielectric and reinforcing members being sufficient to preclude contact with the conductive member between said support areas when said dielectric member is in tension, whereby the desired spacing between the conductive member and the electric member to effect electrostatic charge deposition occurs in the unsupport region of the dielectric member.

2. The apparatus of claim 1 wherein the dielectric, conductive, and reinforcing members are constructed in the form of a flexible endless belt and means are provided for driving the belt in tension relative to the support areas.

3. The apparatus of claim 1 wherein the support means maintains the dielectric, conductive, and reinforcing members in tension at least in the region of the support areas, and the support areas of the support means provide smooth belt contact support faces.

4. The apparatus of claims 1, 2, or 3 wherein the conductive member comprises an electrode array extending across the dielectric member, and electric means are provided to selectively energize the electrodes in the electrodes array to effect change in the charge level of the dielectric member.

5. Apparatus for establishing the spacing between an electrode array and a flexible moving dielectric member in an electrographic printer comprising:

- a print head having a length substantially equal to or greater than the width of the flexible movable dielectric member and including an electrode array extending along the length of the print head, each electrode in the array terminating in an end facing outwardly therefrom;
- a tensioned flexible dielectric member supported for movement relative to said print head and for engagement therewith, said dielectric member having a conductive ground plane layer on the side opposite to said print head;
- said print head having generally smooth arcuate face portions disposed on opposite sides of the electrode array for supporting engagement with the dielectric member as it moves across the face of said print head;
- the portion of said print head between said arcuate face portions being generally flat, said dielectric member having a modulus of bending sufficiently large to provide a portion thereof spaced from said print head;
- the ends of the electrode array being disposed in said generally flat portion of the print head and spaced from the dielectric.

6. The apparatus of claim 5 wherein the ends of the electrodes in the electrode array terminate at the face of the flattened portion of the face of the print head and electrical means are provided to selectively energize electrodes in the array to effect change in the charge level of the dielectric member.

7. The apparatus of claims 5 or 6 wherein the dielectric member is constructed in the form of a flexible endless belt, means are provided for moving the belt past the print head, and the support means for the belt maintains the belt in tension at least in the region of the print head.

8. Apparatus for establishing the spacing between a conductive member and a moving dielectric member under tension in an electrographic printer comprising:

- a flexible dielectric member having an electrically conductive ground backing element;
- support means for the dielectric member including two closely spaced support areas defined by smooth parti-cylindrical surfaces engaging the dielectric member with a flattened area therebetween smoothly merging with the parti-cylindrical surfaces;

a conductive member and means supporting said conductive member in the flattened area of the support means;

the bending modulus of said dielectric member being sufficiently high to preclude contact with the conductive member between said support areas when said dielectric member is in tension;

whereby the desired spacing between the conductive member and the dielectric member to effect electrostatic charge deposition occurs in the unsupported region of the dielectric member.

9. The apparatus of claim 8 wherein the conductive member comprises an electrode array extending across the dielectric member, and electric means are provided to selectively energize the electrodes in the electrode array to effect change in the charge level of the dielectric member and cleaning means are provided to selectively clean the dielectric member support surfaces and the electrode array, said cleaning means being insertable and removable from a position between said support surfaces and the dielectric member as well as the dielectric member and electrodes to effect cleaning thereof while said dielectric member is moving.

10. The apparatus of claim 9 wherein said cleaning material is a soft fibrous material, has a bending modulus substantially less than the dielectric member, the dielecltric member is an endless belt under tension and control means are provided to selective and remove the cleaning means.

* * * * *